United States Patent
Zhi et al.

(10) Patent No.: US 10,886,561 B2
(45) Date of Patent: Jan. 5, 2021

(54) ADAPTABLE ELECTRICAL COMPONENT

(71) Applicant: City University Of Hong Kong, Kowloon (HK)

(72) Inventors: Chunyi Zhi, New Territories (HK); Funian Mo, Kowloon (HK)

(73) Assignee: City University of Hong Kong, Kowloon (HK)

( * ) Notice: Subject to any disclaimer, the term of this patent is extended or adjusted under 35 U.S.C. 154(b) by 83 days.

(21) Appl. No.: 15/980,854

(22) Filed: May 16, 2018

(65) Prior Publication Data
US 2019/0356020 A1    Nov. 21, 2019

(51) Int. Cl.
| | |
|---|---|
| H01M 10/0565 | (2010.01) |
| H01M 4/50 | (2010.01) |
| H01M 4/62 | (2006.01) |
| H01M 2/16 | (2006.01) |
| H01M 4/70 | (2006.01) |
| H01M 4/66 | (2006.01) |
| C08F 220/56 | (2006.01) |
| C08F 220/06 | (2006.01) |
| C08J 3/24 | (2006.01) |
| H01M 4/38 | (2006.01) |
| H01M 4/13 | (2010.01) |

(52) U.S. Cl.
CPC ....... *H01M 10/0565* (2013.01); *C08F 220/06* (2013.01); *C08F 220/56* (2013.01); *C08J 3/24* (2013.01); *H01M 2/1653* (2013.01); *H01M 4/13* (2013.01); *H01M 4/38* (2013.01); *H01M 4/502* (2013.01); *H01M 4/623* (2013.01); *H01M 4/663* (2013.01); *H01M 4/70* (2013.01); *C08J 2333/02* (2013.01); *C08J 2333/26* (2013.01); *H01M 2300/0082* (2013.01)

(58) Field of Classification Search
CPC .................................................. H01M 10/0565
See application file for complete search history.

(56) References Cited

U.S. PATENT DOCUMENTS

| | | | |
|---|---|---|---|
| 6,187,475 B1 * | 2/2001 | Oh .......................... | H01M 4/62 429/205 |
| 2004/0052861 A1 | 3/2004 | Hatcher et al. | |
| 2007/0154553 A1 | 7/2007 | Kim et al. | |

(Continued)

OTHER PUBLICATIONS

Hongfei Li et al, "An extremely safe and wearable solid-state zinc ion battery based on a hierarchical structured polymer electrolyte". Energy & Environment Science, 2018, DOI 10.1039/c7ee03232c.

(Continued)

*Primary Examiner* — Matthew J Merkling
(74) *Attorney, Agent, or Firm* — Renner Kenner Greive Bobak Taylor & Weber

(57) ABSTRACT

A system and a method for an adaptable electrical component including a first electrode and a second electrode; the first electrode being spaced apart from the second electrode; a polymer electrolyte disposed between the first electrode and the second electrode; a housing retaining the first electrode, second electrode and the polymer electrolyte; wherein the polymer electrolyte is a thermoresponsive polymer electrolyte, such that one or more characteristics of the polymer electrolyte changes in response to a temperature exceeding a threshold.

27 Claims, 10 Drawing Sheets

(56) References Cited

U.S. PATENT DOCUMENTS

| | | | | |
|---|---|---|---|---|
| 2009/0311587 A1* | 12/2009 | Best | .................... | H01M 2/0275 |
| | | | | 429/127 |
| 2013/0095237 A1 | 4/2013 | Kalyankar et al. | | |
| 2015/0318531 A1* | 11/2015 | Kung | ................ | H01M 10/4235 |
| | | | | 429/145 |
| 2016/0093923 A1* | 3/2016 | Wang | ................ | H01M 10/0565 |
| | | | | 429/302 |
| 2017/0263931 A1* | 9/2017 | Wu | .................... | C01G 45/1228 |

OTHER PUBLICATIONS

Hui Yang et al, "Self-Protection of Electrochemical Storage Devices via a Thermal Reversible Sol-Gel Transition", Advanced Materials, 2015, 27, 5593-5598.

Shengtong et al, "A one-step strategy for thermal-and pH-responsive graphene oxide interpenetrating polymer hydrogel networks". Journal of Materials Chemistry, 2011, 21, 4095-4097.

Guohau Deng et al, "Covalent Cross-Linked Polymer Gels with Reversible Sol-Gel Transition and Self-Healing Properties". Macromolecules, 2010, 43(3): 1191-1194.

* cited by examiner

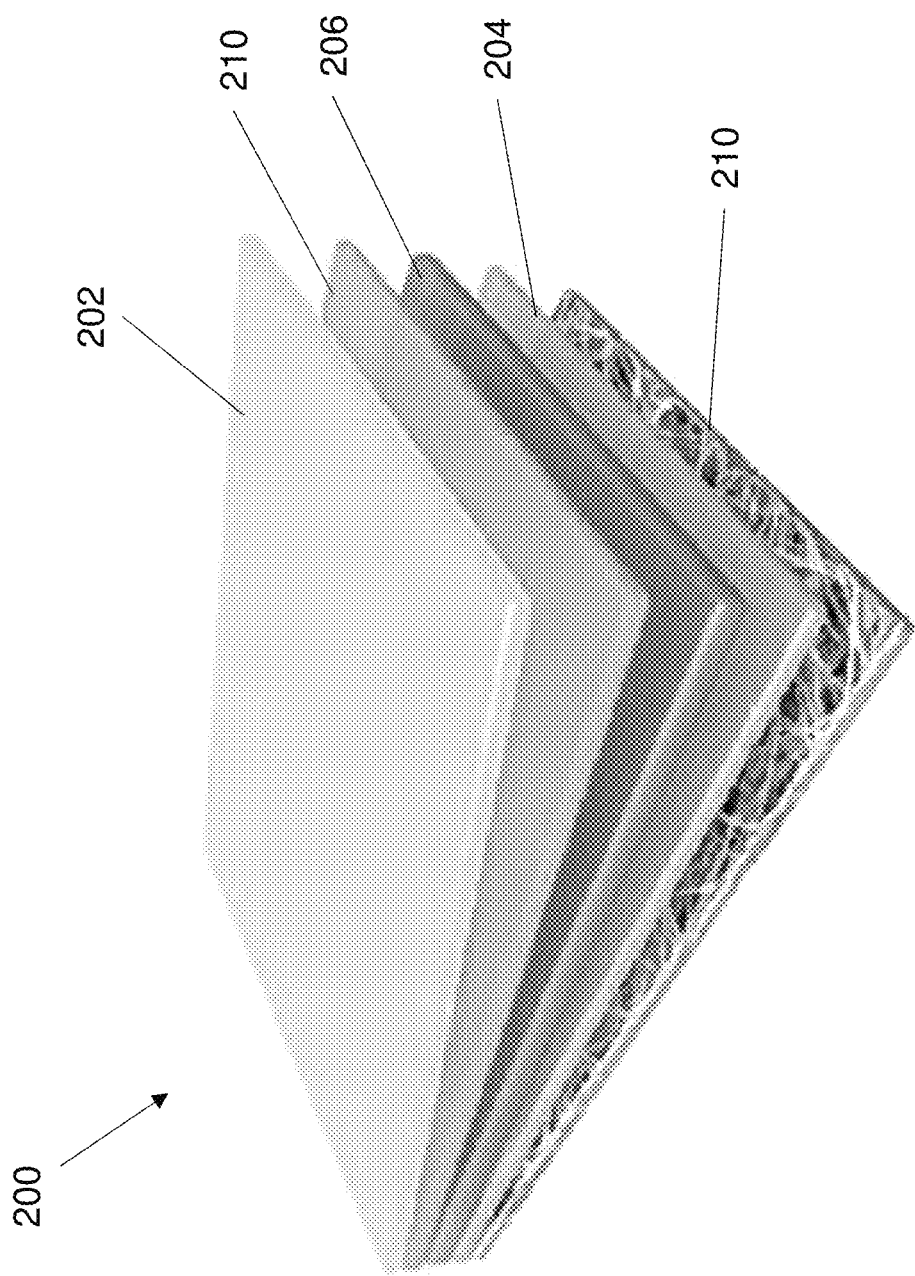

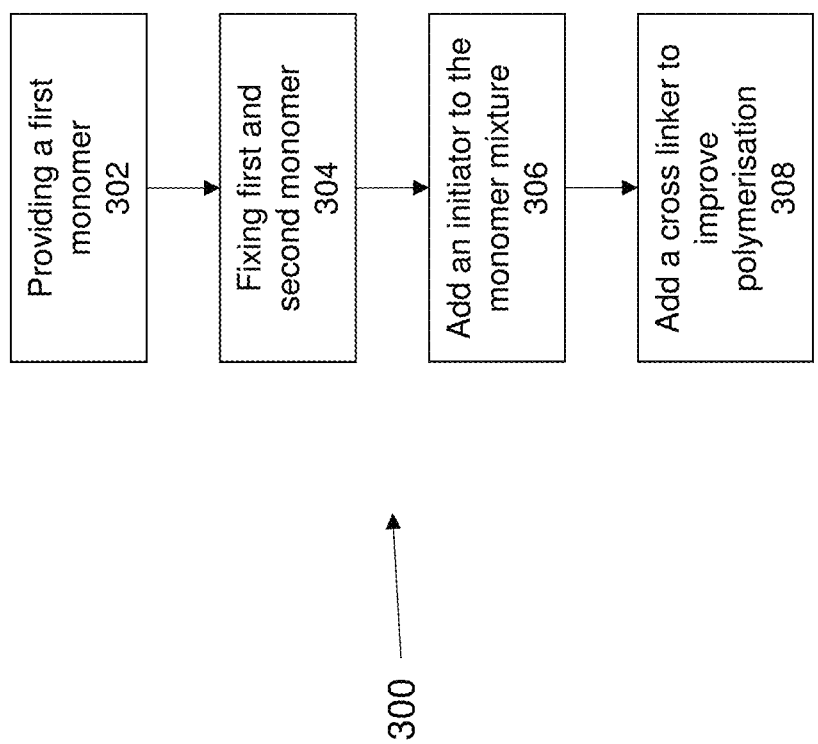

ADAPTABLE ELECTRICAL COMPONENT

TECHNICAL FIELD

The present invention relates to an electrical component, in particular but not limited to, an adaptable electrical component that can adapt to one or more changes or stimuli applied to the electrical component. The present invention also relates to an electrolyte for use in an electrical component such as for example a battery.

BACKGROUND

Electrical components are common place in the modern world, and are used in a wide variety of different industries and applications. Batteries are one example of an electrical component that are commonly and widely used in various different applications. Batteries comprise a plurality of cells that are arranged in parallel or series. With the rapid development of electric vehicles, portable electronics, mobile devices (e.g. smartphones, tablets etc.) and smart grid storage, high energy density and high power delivery batteries (i.e. high energy and high power batteries) are in increased demand.

Many types of new materials and technologies have accelerated the improvement in battery technology. However batteries are still susceptible to temperature related issues such as reduced performance or reduced safety. Batteries, in particular high energy and high power batteries, tend to generate a lot of heat in ultrafast charge/discharge cycles. These high energy and high power batteries can also be susceptible to other hazardous conditions such as overcharging and short circuits, leading to overpressure and/or overheating.

Increased temperature and/or heat can cause damage to the electrical component or at least compromise the performance of the battery. To dissipate the accumulated heat in the batteries, physical safety designs such as fuses, fused disconnect switches, extinguishing agents, heat sinks and shutdown current collectors are generally employed. The draw back with these approaches, is that these approaches only provide one time protection.

SUMMARY OF THE INVENTION

It is an advantage of some embodiments of the present invention to provide an adaptable electrical component that is adaptable or at least provide the public with a useful alternative. The adaptable electrical component may be adaptable to one or more stimuli e.g. external inputs or changes in environmental conditions.

Other objects of the invention (or inventions) may become apparent from the following description and drawings, which is given by way of example only.

The present disclosure generally relates to an adaptable electrical component that can provide the public with a useful alternative.

In accordance with a first aspect the present disclosure relates to an adaptable electrical component comprising:
 a first electrode and a second electrode;
 the first electrode being spaced apart from the second electrode;
 a polymer electrolyte disposed between the first electrode and the second electrode;
 a housing retaining the first electrode, second electrode and the polymer electrolyte;
 wherein the polymer electrolyte is a thermoresponsive polymer electrolyte, such that one or more characteristics of the polymer electrolyte changes in response to a temperature exceeding a threshold.

In an embodiment the temperature is either temperature of the polymer electrolyte or temperature within the housing.

In an embodiment the one or more characteristics are one or more of: electrical conductivity, phase, viscosity, density, electrical resistance or mass.

In an embodiment the phase and electrical conductivity of the polymer electrolyte changes when the temperature exceeds a threshold.

In an embodiment the polymer electrolyte is a first phase and having a first electrical conductivity when the temperature is below the threshold;
 the polymer electrolyte changes phase to a second phase and having a second electrical conductivity when the temperature exceeds the threshold;
 wherein the first electrical conductivity is greater than the second electrical conductivity; and;
 wherein the polymer electrolyte changes back to a first phase and having a first conductivity when the temperature drops below the threshold.

In an embodiment the first phase is a solution phase and the second phase is a gel phase.

In an embodiment the first electrode is an anode and the second electrode is a cathode; wherein the polymer electrolyte permits transfer of charge from the anode to the cathode while the polymer electrolyte is in the first phase and the polymer electrolyte restricting transfer of charge from the anode to the cathode while the polymer electrolyte is in the second phase.

In an embodiment the polymer electrolyte comprises a first phase to second phase transition time of less than 200 seconds and the polymer electrolyte comprises a second phase to first phase transition time of less than 300 seconds.

In an embodiment the polymer electrolyte comprises a copolymer formed from an acrylamide and an acrylic acid.

In an embodiment the polymer electrolyte comprises a poly (N-isopropylacrylamide-co-acrylic acid) copolymer.

In an embodiment the polymer electrolyte comprises one or more dissolved salts.

In an embodiment the anode comprises zinc or a zinc compound; and the cathode comprises manganese or manganese compound.

In an embodiment the anode comprises a zinc foil and the cathode comprises one or more manganese dioxide rods or a manganese dioxide sheet.

In an embodiment the cathode further comprises polyvinylidene fluoride.

In an embodiment the electrical component comprises a separator disposed between the anode and the cathode such that a short circuit is avoided between the anode and the cathode.

In an embodiment the separator comprises a polyacrylonitrile (PAN) membrane.

In an embodiment the electrical component comprises a current collector and wherein a portion of the cathode is attached to the current collector.

In an embodiment the current collector is a plate, the cathode is a paste including a plurality of manganese dioxide rods, and wherein the paste is disposed on one side of the plate.

In an embodiment the current collector comprises a cloth comprising one or more carbon nanotubes.

In an embodiment the adaptable electrical component is battery.

In accordance with a further aspect, the present disclosure relates to an adaptable electrical component, the adaptable electrical component is an adaptable battery, wherein the adaptable electrical component comprises:

an anode, a cathode, the anode being spaced away from the cathode;

a polymer electrolyte disposed between the anode and the cathode;

a separator element being disposed between the anode and the cathode;

a current collector, the current collector being a planar element having at least two sides, the cathode being disposed on a side of the current collector that faces the anode;

the anode comprising a zinc;

the cathode comprising manganese dioxide;

the polymer electrolyte being a thermoresponsive polymer electrolyte, the polymer electrolyte is changeable between a first phase and a second phase, the polymer electrolyte changes from a first phase to the second phase when the temperature of the polymer electrolyte exceeds a threshold; and the polymer electrolyte changes from a second phase to a first phase when the temperature of the polymer electrolyte reduces to below the threshold;

in a first phase the polymer electrolyte being electrically conductive such that in the first phase ions being able to freely migrate between the anode and the cathode, and;

in a second phase the polymer electrolyte being less conductive than when in the first phase such that in the second phase ions being inhibited from moving between the anode and the cathode thereby shutting down or reducing operation of the electrical component.

In an embodiment the cathode comprises a plurality of manganese dioxide rods positioned in situ among a plurality of carbon tubes; and the anode comprising zinc foil, and wherein the manganese dioxide further comprises alpha phase manganese.

In an embodiment the electrical component the current collector comprises a rough plane, the cathode being disposed on the rough plane, and the current collector comprises a carbon nanotube cloth.

In an embodiment the cathode comprises an alpha phase manganese dioxide paste.

In an embodiment the cathode further comprises polyvinylidene fluoride (PVDF).

In an embodiment the polymer electrolyte comprises poly (N-isopropylacrylamide-co-acrylic acid) copolymer with zinc sulphate salts or zinc sulfide salts dissolved therein.

In an embodiment the separator element comprises a polyacrylonitrile (PAN) membrane.

In accordance with a further aspect, the present disclosure relates to a method synthesizing an electrolyte for a battery, the method comprising the steps of:

providing a first monomer and a second monomer;

mixing the first monomer and second monomer;

adding an initiator to initiate a polymerization process, wherein the polymerization process is a free radical polymerization process to form the electrolyte and wherein the electrolyte is a copolymer electrolyte.

In an embodiment the first monomer is an N-isopropylacrylamide and the second monomer is an acrylic acid.

In an embodiment the initiator comprises a potassium persulfate (KPS).

In an embodiment the method further comprises adding a cross linker in addition to the initiator to create the electrolyte, wherein the cross linker comprises a methylene-bis-acrylamide (MBAA).

In accordance with a further aspect, the present disclosure relates to an electrolyte for use in an electrical component comprising:

a first monomer, a second monomer forming a copolymer;

the electrolyte is a thermoresponsive copolymer, such that the electrolyte changes from a first phase to a second phase when the temperature of the electrolyte exceeds a threshold and the electrolyte changes from the second phase to the first phase when the temperature of the electrolyte reduces below the threshold.

In an embodiment the electrolyte is a sol-gel electrolyte.

In an embodiment the electrolyte is a solution when in the first phase and the electrolyte is a hydrogel when in the second phase.

In an embodiment the electrolyte in the second phase is more viscous than when in the first phase.

In an embodiment the electrolyte is more electrically conductive or allows free flow of ions when in the first phase, and the electrolyte being electrically less conductive when in the second phase.

In an embodiment the first monomer is an N-isopropylacrylamide and the second monomer is an acrylic acid.

In an embodiment the electrolyte is formed by mixing the first monomer with the second monomer and adding an initiator to initiate a polymerization process, wherein the polymerization process is a free radical polymerization process to form the electrolyte and wherein the electrolyte is a copolymer electrolyte.

In an embodiment initiator comprises a potassium persulfate (KPS).

In an embodiment the electrolyte further comprises a cross linker, wherein the cross linker comprises a methylene-bis-acrylamide (MBAA).

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein the term battery means an electrical component that provides electrical energy (i.e. power) by converting one form of energy to electrical energy. The term battery, as used herein is meant to cover a cell and/or battery.

As used herein the term thermoresponsive means something that is responsive to temperature changes. In this description the term thermoresponsive is used to describe an electrolyte or electrical component or other things that change their function or react to temperature changes.

As used herein the term 'and/or' means 'and' or 'or', or where the context allows both.

The invention consists in the foregoing and also envisages constructions of which the following gives examples only. In the following description like numbers denote like features.

As used herein "(s)" following a noun means the plural and/or singular forms of the noun.

In the following description, specific details are given to provide a thorough understanding of the embodiments. However, it will be understood by one of ordinary skill in the art that the embodiments may be practiced without these specific details. For example, software modules, functions, circuits, etc., may be shown in block diagrams in order not to obscure the embodiments in unnecessary detail. In other instances, well-known modules, structures and techniques may not be shown in detail in order not to obscure the embodiments.

Also, it is noted that at least some embodiments may be described as a method (i.e. process) that is depicted as a flowchart, a flow diagram, a structure diagram, or a block diagram. Although a flowchart may describe the operations as a sequential method, many of the operations can be performed in parallel or concurrently. In addition, the order of the operations may be rearranged. A method (i.e. process) is terminated when its operations are completed.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments. The term "comprising" (and its grammatical variations) as used herein are used in the inclusive sense of "having" or "including" and not in the sense of "consisting only of".

The invention (or inventions) as described herein may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

Notwithstanding any other forms which may fall within the scope of the present disclosure, a preferred embodiment will now be described, by way of example only, with reference to the accompanying drawings in which:

FIG. 2 shows a further embodiment of an adaptable electrical component that can change a characteristic in response to a temperature change.

FIG. 3a shows an exemplary method of forming an electrolyte for use in the electrical component of FIG. 1 and FIG. 2.

DETAILED DESCRIPTION OF THE PREFERRED EMBODIMENTS

Electrical or electronic components are ubiquitous in the modern world and are used in a wide variety of operations. Batteries are an example of an electrical component that are ubiquitous in the modern world. A battery comprises a plurality of cells. Cells i.e. electrical cells generate convert chemical energy to electrical energy. The electrical energy is supplied by the cell (or battery) to power one or more device that are electrically coupled to the cell (or battery).

With the rapid development of electric vehicles, portable electronics, solar energy and other uses, the need for high energy and high power delivery batteries are in increasing demand. Many new types of new materials and technologies have accelerated the improvement in high energy and high power batteries, however safety and safe operation of such high energy and high power batteries is an ever present issue. Such high power, high energy batteries generate a large amount of heat in ultrafast charge/discharge cycles and can also create other hazardous situations such as overpressure and overheating, due to overcharging and/or due to short circuits. Increased temperature (i.e. high heat accumulation) in these type of batteries (or any battery) can be a major issue that can affect performance, usability and safety.

In order to dissipate the heat accumulated within batteries, physical safety designs such as fused disconnect switches, fuses, extinguishing agents and shutdown current collectors have been used with or incorporated into batteries. However these approaches only provide a one time protection approach. Currently these approaches do not provide continuously safe operation of high power and high energy batteries.

The present disclosure relates to an adaptable electrical component that is configured to change one or more characteristics in response to a temperature change. The adaptable electrical component is adaptable to temperature changes. The adaptable electrical component is a power supply component (i.e. a power supply device).

The described electrical component (i.e. battery) provides thermal protection, such that the electrical component can stop working at high temperatures as a result of increased resistance of the electrolyte at high temperatures i.e. when the temperature exceeds a threshold temperature. The electrolyte changes phase in response to the temperature exceeding a threshold. The electrolyte has a higher conductivity when the temperature is below a threshold. The electrical conductivity is reduced once the temperature exceeds a threshold. The electrical component stops working once the temperature exceeds the threshold, and resumes normal operation once the temperature falls below the threshold.

The present disclosure also relates to a "smart battery" that can experience different charge-discharge rates under various temperature levels, providing a battery that manages thermal runaway by changing operating conditions based on a temperature threshold.

Figure 1:
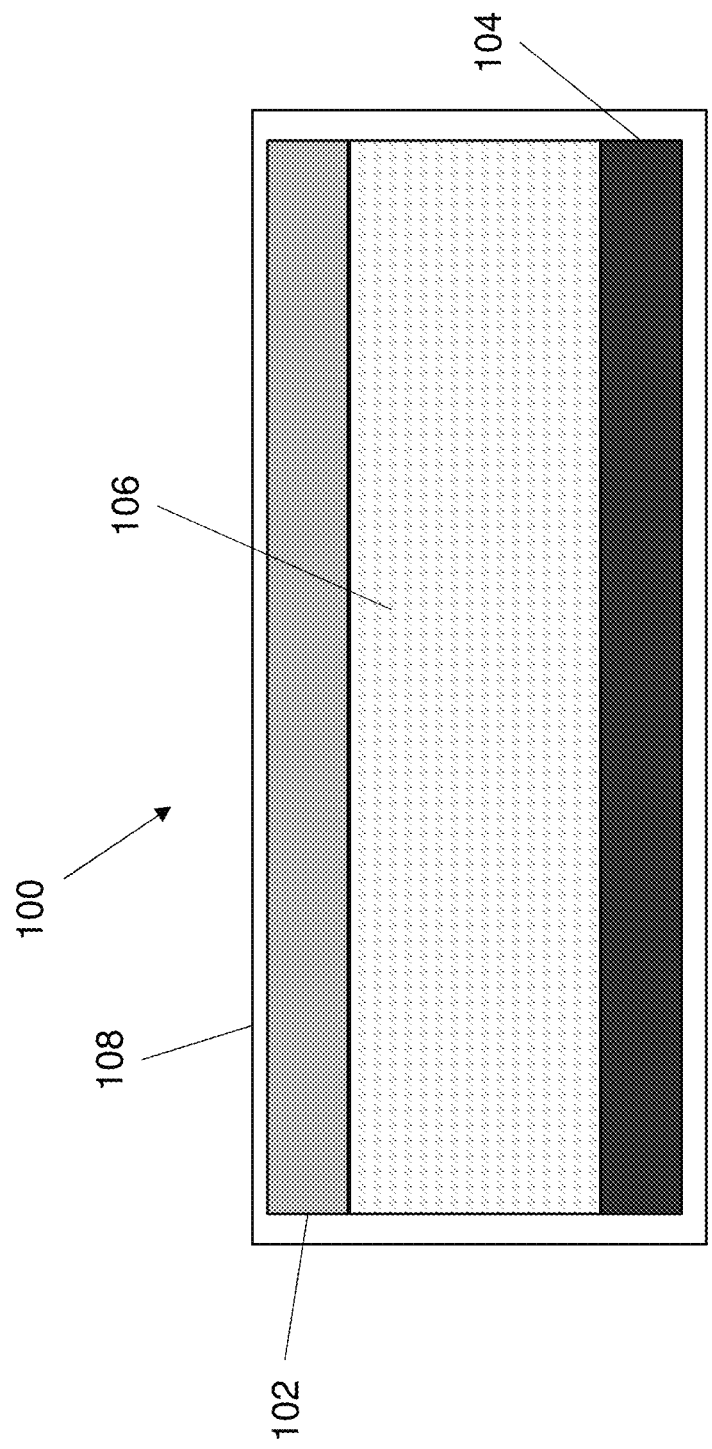
FIG. 1 is an embodiment of an adaptable electrical component that can change a characteristic in response to a temperature change.

FIG. 1 shows an example embodiment of an adaptable electrical component 100. In this example embodiment the electrical component 100 is an adaptable battery that can change one or more characteristics in response to temperature changes (i.e. heat changes). The adaptable battery 100 adapts to the battery temperature changes and/or temperature within the battery 100. The battery 100 changes one or more characteristics of the battery in response to the temperature change. In some embodiments, the one or more characteristics are changed in response to a temperature increasing above a threshold. The threshold is preferably a predetermined threshold. The threshold is defined as part of the electrolyte design process.

Referring to FIG. 1, the battery (i.e. power supply component) 100 comprises a first electrode 102, a second electrode 104 and an electrolyte 106. The first electrode 102 and the second electrode 104 are spaced apart from each other and the electrolyte 106 is disposed between the first electrode 102 and the second electrode 104. The first electrode 102 functions as an anode and the second electrode 104 functions as a cathode. The arrangement of electrodes may be reversed. The first electrode 102 (i.e. anode 102) is spaced apart from the second electrode 104 (i.e. cathode 104). The battery 100 comprises a housing 108 that houses the first electrode 102, second electrode 104 and electrolyte 106.

The housing 108 may be a plastic housing or a metal casing or any other suitable material. The housing 108 may be any suitable shape e.g. a rectangular prism or a cylinder etc. The housing may include one or more pins or portions that act as a current collector to gather charge from the cathode and transmit the charge to a component coupled to the battery.

During operation of the battery a redox reaction occurs where electrons (i.e. ions) flow from the anode to the cathode during the power discharge process. The component 100 may function as a normal electrochemical battery (or cell). The electrolyte 106 that acts as an electrically conducting solution that electrically couples the anode and cathode.

Further details of the electrolyte will be described in more detail later.

FIG. 2 shows a further example embodiment of an adaptable electrical component 200. The electrical component 200 is preferably a battery (or cell). The adaptable battery 200 is configured to change operation when the temperature exceeds over a threshold. The adaptable electrical component 200 (i.e. adaptable battery 200) functions as a battery while the temperature of the battery is below a threshold, and the battery stops working when the temperature exceeds the threshold. The operation of the battery 200 automatically resumes its operative state (i.e. begins operation) when the temperature reduces to below the threshold.

The adaptable battery 200 comprises a first electrode 202, a second electrode 204, an electrolyte 206 disposed between the first and second electrode, a current collector 208 and a separator element 210. These components are disposed within a housing. The housing may be formed from a suitable material such as for example plastic, metal or any other suitable material. The housing may be formed into any suitable shape such as for example a cylinder, a rectangular prism, a rhomboid prism or any other suitable shape. The components 202-210 forms a sandwiched structure within the housing.

The first electrode 202 and second electrode 204 are spaced apart from each other and the electrolyte 206 is preferably disposed between the first and second electrodes. The first electrode 202 is an anode and the second electrode 204 is a cathode. The anode 202 transmits ions to the cathode 204 during normal operation of the battery. The ions are transmitted through the electrolyte 206 and the electrolyte 206 electrically couples the anode 202 to the cathode 204.

Referring to FIG. 2 the anode 202 comprises zinc or a zinc compound. The anode 202 comprises a zinc plate. The anode 202 may be a flexible zinc plate. The cathode 204 comprises manganese dioxide. In the example shown in FIG. 2, the cathode 204 comprises alpha phase manganese dioxide that is formed into Nano rods, and the cathode is formed as a paste.

The cathode 204 is preferably coupled to the current collector 208 as shown in FIG. 2. The current collector 208 may be of any suitable shape. In the illustrated embodiment of FIG. 2, the current collector is a planar element i.e. a plate having at least two sides. The cathode 204 is disposed on one side of the current collector 208. The current collector may comprises a rough plane and the cathode is disposed on the rough plane. The rough plane is located on a side that faces the anode, and the cathode is disposed on the side of the current collector 208 that faces the anode 202.

The current collector may comprise a carbon nanotube cloth that comprises a plurality of carbon nanotubes. The manganese dioxide paste is disposed on the carbon nanotube cloth. In one example the manganese dioxide Nano rods are formed in-situ among the plurality of carbon tubes of the current collector 208. The current collector 208 may include a rough face, and the cathode paste may be disposed on the rough face of the current collector. The current collector may be electrically conductive.

The separator element 210 is disposed between the anode 202 and the cathode 204. The separator element separates the anode 202 and the cathode 204 in order to prevent or at least reduce short circuit between the anode 202 and the cathode 204. The separator layer 210 comprises a polyacrylonitrile (PAN) membrane.

The electrical component 200 may optionally comprise a housing. The housing may be formed of any suitable material that is durable and robust thereby protecting the electrical component and its internal elements from damage. The housing may comprise a plastic material or may comprise a metal.

The electrolyte used in either embodiment of the battery is preferably similar in construction and function. Details of the electrolyte function and composition will now be described in more detail below.

The electrolyte 106, 206 comprises a reversible sol-gel transition polymer electrolyte. The term sol-gel means a substance that can change between a solution phase and a gel phase. The electrolyte 106, 206 is preferably a copolymer electrolyte formed from at least two polymers by a suitable polymerisation process. Alternatively the electrolyte 106, 206 may be a hydrogel. The electrolyte 106, 206 is thermoresponsive i.e. changes one or more characteristics in response a change in temperature. The one or more characteristics may be any one or more of electrical conductivity, phase, viscosity, density, electrical resistance or mass. The electrolyte 106, 206 is a reversible sol-gel electrolyte such that the characteristic changes if the temperature exceeds or reduces below a threshold temperature.

In the illustrated embodiments the electrolyte 106, 206 is configured to change phase (i.e. physical state) in response to a thermal stimulus. The electrolyte 106, 206 is in a first phase while the temperature of the electrolyte (or the temperature within the housing) is below a temperature threshold. The electrolyte 106, 206 is in a second phase if the temperature of the electrolyte 106 (or the temperature within the housing) exceeds the temperature threshold. The change in phase also causes a change in electrical conductivity thereby changing the performance of the electrical component.

The first phase is a solution phase. The electrolyte may be a flowing liquid at or below the temperature threshold (i.e.

in a first phase the electrolyte 106, 206 is a flowable liquid). The second phase is a gel phase, and preferably a hydrogel phase. The hydrogel preferably has a higher viscosity than the solution in the first phase. The electrolyte 106, 206 changes from a first phase to a second phase when the temperature of the electrolyte exceeds a temperature threshold. The electrolyte 106, 206 spontaneously (i.e. without any external input or user input) changes phase back from a second phase to a first phase when the temperature equals or is below the temperature threshold. The temperature threshold may be predetermined and the electrolyte 106, 206 may be designed to have a phase transition point at a specified temperature. The particular composition of the electrolyte 106, 206 determines the temperature threshold and the speed of the phase change. The phase change is fast enough to change functionality of the electrical component as the temperature exceeds a threshold or reduces below a threshold.

The electrolyte 106, 206 changes electrical conductivity in response to a thermal stimulus. The electrolyte 106, 206 changes electrical conductivity as the phase changes. The electrolyte 106, 206 has a first electrical conductivity when in the first phase and the electrolyte 106, 206 has a second electrical conductivity when in the second phase. The first electrical conductivity is higher than the second electrical conductivity. The electrolyte 106, 206 has a higher electrical conductivity when the electrolyte 106, 206 is in a first phase (solution phase), than when the electrolyte 106 is in a second phase (gel phase).

In a first phase the electrolyte 106, 206 is electrically conductive such that in the first phase ions being able to freely migrate between the anode and the cathode, and in a second phase the electrolyte 106, 206 ions being inhibited from moving between the anode and the cathode thereby shutting down or reducing operation of the electrical component (i.e. battery). The polymer electrolyte 106, 206 comprises a first phase to a second phase transition time of less than 200 seconds. Preferably the polymer electrolyte 106, 206 has a phase transition time of less than 100 seconds. The electrolyte 106, 206 is adaptive and thereby affects the performance of the component.

The polymer electrolyte 106, 206 is formed to have a second phase to first phase transition time of less than 300 seconds. The phase transition time for the electrolyte is fast enough to ensure the adaptable component 100, 200 stops operation when temperature exceeds the threshold in order to prevent thermal runaway and prevent damage to the component (i.e. battery).

The electrolyte 106, 206 is preferably comprises one or more polymers. In one example configuration the polymer electrolyte 106, 206 is formed by mixing two polymers. The electrolyte 106, 206 comprises a copolymer formed from an acrylamide and an acrylic acid. In one example configuration the polymer electrolyte comprises a poly (N-isopropylacrylamide-co-acrylic acid) (PNA). The polymer electrolyte 106, 206 may also comprise one or more dissolved salts. In one example composition the electrolyte 106, 206 may comprise zinc sulphate or manganese sulphate or a combination thereof, or alternatively any other suitable salts.

The electrolyte 106, 206 is synthesized by using a free radical polymerization approach. FIG. 3a shows a flow chart illustrating an embodiment for synthesizing an electrolyte. The electrolyte 106, 206 may be formed using the method described in FIG. 3a. The method 300 of synthesizing an electrolyte for an electrical component (e.g. a battery or cell) commences at step 302. Step 302 comprises providing a first monomer and a second monomer. The first monomer is an N-isopropylacrylamide (NIPAM) and the second monomer is an acrylic acid (AA).

Step 304 comprises mixing the first monomer and the second monomer. The first and second monomer are mixed by stirring or by agitation or another suitable mixing method. The first and second monomers may be provided in a receptacle e.g. a crucible and an agitator may be used to mix the first and second monomers together.

Step 306 comprises adding an initiator to initiate a free radical polymerization process. The initiator is a potassium persulfate (KPS). The KPS can be added at any suitable time e.g. during the mixing step or prior to mixing such that the KPS is mixed with the first and second monomer.

Step 308 comprises adding a cross linker into the mixture of the first monomer, second monomer and the initiator. The cross linker comprises methylene-bis-acrylamide (MBAA). The cross linker can improve the polymerisation process. The cross linker may be added after adding the initiator or the cross linker may be added at the same time as the initiator is added.

Figure 3B:
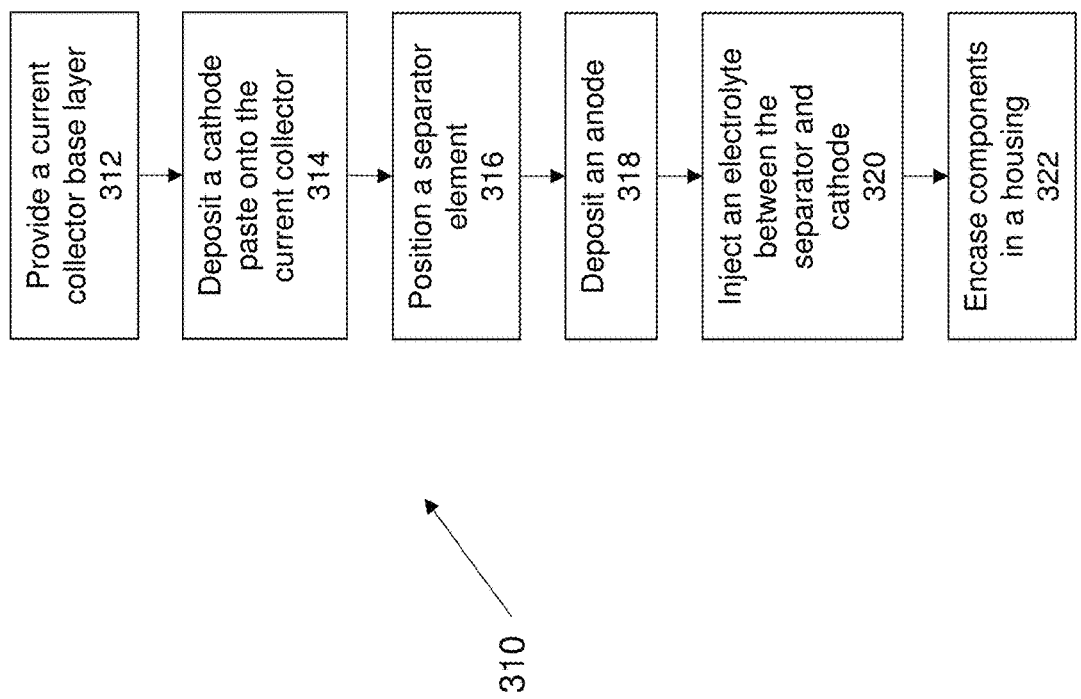
FIG. 3b shows an exemplary method of forming the adaptable electrical component according to FIG. 2.

FIG. 3b discloses a method 310 of constructing the adaptable electrical component. FIG. 3b illustrates a method of constructing an adaptable battery. The method commences at step 312. Step 312 comprises providing a base layer. The base layer is a current collector. The current collector is carbon cloth comprising carbon nanotubes. Step 314 comprises depositing a cathode onto the current collector. The cathode is a manganese dioxide paste that is deposited onto the current collector. The cathode may be deposited using an electro deposition technique. Step 316 comprises positioning the separator element onto the deposited cathode. The separator element in one example is a polyacrylonitrile (PAN) membrane. Step 318 comprises depositing the anode onto the separator element. The anode is a zinc plate or a plate comprising a plurality of zinc rods or zinc Nano rods. The zinc anode may be adhered or added by using a deposition technique. Step 320 comprises injecting the electrolyte between the anode and cathode. The electrolyte in this example comprises a poly (N-isopropylacrylamide-co-acrylic acid) copolymer. More specifically the electrolyte is injected between the separator and the cathode. Step 322 comprises encasing all the battery components into a housing. The housing may be a plastic or polymer housing that can be formed about the components of the battery in any suitable manner.

The method 310 may comprise other additional known steps in constructing a battery e.g. adding sealing the electrolyte to prevent leakage, adding insulation layers or mechanical seals or other components that are known and required for a battery. The adaptable battery may be constructed into any suitable shape such as for example a cylinder, a rectangular prism, a button or disc or a planar plate.

Figures 4A, 4B:
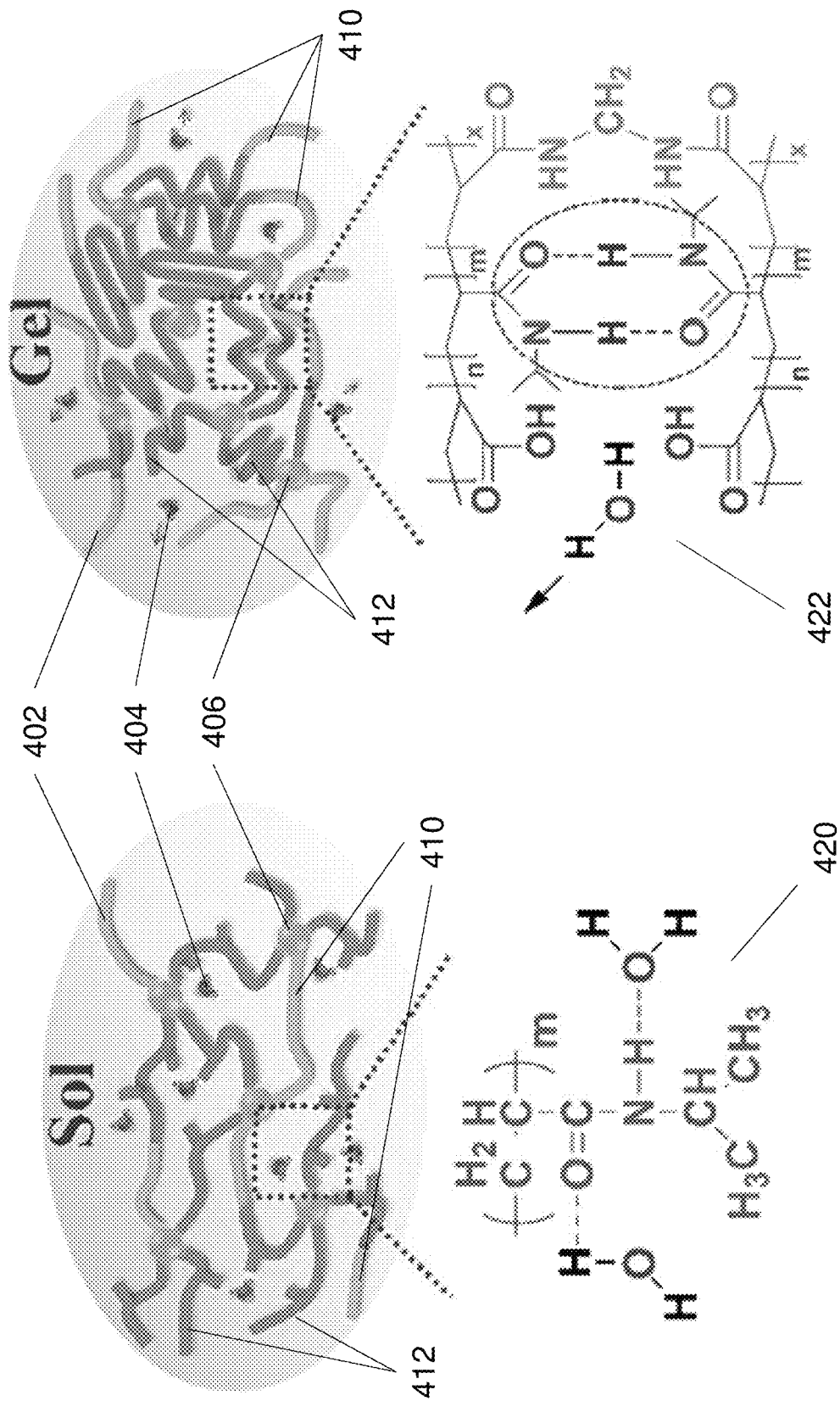
FIGS. 4a and 4b illustrate the change in phase of the electrolyte when the temperature exceeds a threshold.

FIGS. 4a and 4b illustrate the mechanism of the reversible sol-gel electrolyte. FIGS. 4a and 4b illustrate the change in phase when the temperature exceeds a threshold. FIGS. 4a and 4b show the molecular interaction in each phase and the change in the molecular structure during the change in phase. FIG. 4a illustrates the composition of the electrolyte 106, 206 in a first phase (i.e. a solution phase). FIG. 4b illustrates the composition of the electrolyte 106, 206 in a second phase (i.e. a gel phase). The electrolyte 106, 206 comprises PNA chains 402, water molecules 404 and MBAA molecules 406. Each of the PNA chains includes a hydrophobic and hydrophilic segment (or segments). The hydrophobic segments are illustrated as section 410. The hydrophilic segments are shown as elements 412. The interaction between these chains and the various molecules within the electrolyte.

FIG. 4a shows the electrolyte while in the first phase (i.e. solution phase). FIG. 4b shows the electrolyte while in the second phase (i.e. gel phase). There are two kinds of interactions within the PNA chains: (1) hydrogen bon forces of the carbonyl and imide groups with the surrounding water molecules 404 (i.e. hydrophilic behaviour) and (2) hydrophobicity of isopropyl groups in the NIPAM portion of the PNA chain.

At a low temperature (i.e. below the temperature threshold), due to good water solubility of acrylic acid, the copolymer forms a stronger hydrogen bond force with water molecules than the hydrophobic part of the isopropyl group, driving the copolymer to form micelles so that the polymer solution freely flows. This allows the electrolyte to flow freely when in the first phase. FIG. 4a shows the polymer chains mixed with or dissolved with the water and the structure of the aqueous polymer, as indicated by reference numeral 420.

When the electrolyte is heated to exceed the temperature threshold, hydrogen bonds of the carbonyl and imide groups with the surrounding water molecules are broken (or reduced) and the hydrophobic force of the isopropyl groups plays a stronger role. This causes the polymer molecular chains (i.e. PNA chains) to separate from the water, leading to precipitation of the gel due to the physical cross linking effect between the hydrophobic chains. This is shown in FIG. 4b, where the polymer chains tend to bunch up due to the cross linking effect and precipitate out. FIG. 4b shows the electrolyte in the second phase i.e. the gel phase. FIG. 4b also shows the structure of the polymer when in the gel phase as indicated by reference numeral 422.

The electrolyte transitions between the first phase and second phase when the temperature exceeds a threshold and reverts back from the second phase to the first phase when the temperature drops below or is equal to the threshold. When temperature decreases below a threshold, the hydrogen bonds reform between the water molecules and the isopropyl groups, thus causing the polymer electrolyte to revert back to the first phase i.e. become a solution again. Since the electrolyte has short branched chains and small hindrance of polyacrylic acid components, the hydrogen bonds are easily formed between NIPAM portions in the PNA electrolyte.

The threshold temperature for phase transition may be predetermined and based on the contents of the NIPAM and AA or the concentration in the water solvent. For example, the phase transition temperature (i.e. gelation temperature) of the electrolyte with a 6:4 molar ratio of NIPAM to AA (within the PNA electrolyte) and a concentration of 20% is about 50 degrees Celsius. The described electrolyte in this specification the temperature threshold is 50 degrees Celsius. In one example the electrolyte may be formulated such that the solution to gel transition time is 15 seconds or less but preferably 10 seconds or less. The electrolyte is formulated to have a gel to solution transition time is less than 20 seconds or less but preferably 15 seconds or less. The transition times are preferably within the tens of seconds range to ensure the electrical component can switch off (i.e. shutdown performance) as soon the temperature exceeds over the threshold.

The resistance of the electrolyte is substantially constant in the solution state (i.e. in the first phase), for example less than 19 MΩ. The resistance of the electrolyte is over 150 MΩ when in the gel state (i.e. in the second state). The resistance of the electrolyte increases as the temperature increases while the electrolyte is in the second phase. The resistance also increases significantly as the electrolyte transitions from a first phase to the second phase, and reduces significantly as the electrolyte transitions from the second phase back to the first phase. The high resistance in the second phase reduces conductivity of the electrolyte to the point where the electrical component e.g. a battery or capacitor implementing the electrolyte will cease operation when the temperature of the component exceeds a threshold (i.e. due to the electrolyte transitioning from the first phase to the second phase). Operation of the electrical component is restored as the electrolyte transitions from the second phase back to the first phase (i.e. due to the reduced resistance of the electrolyte).

The electrolyte as described herein provides a reversible thermoresponsive electrolyte that can provide a battery with self-protection especially in response to temperature exceeding a temperature threshold. The use of the electrolyte as described herein provides safe batteries that can turn off due to high temperatures.

Figure 5A:
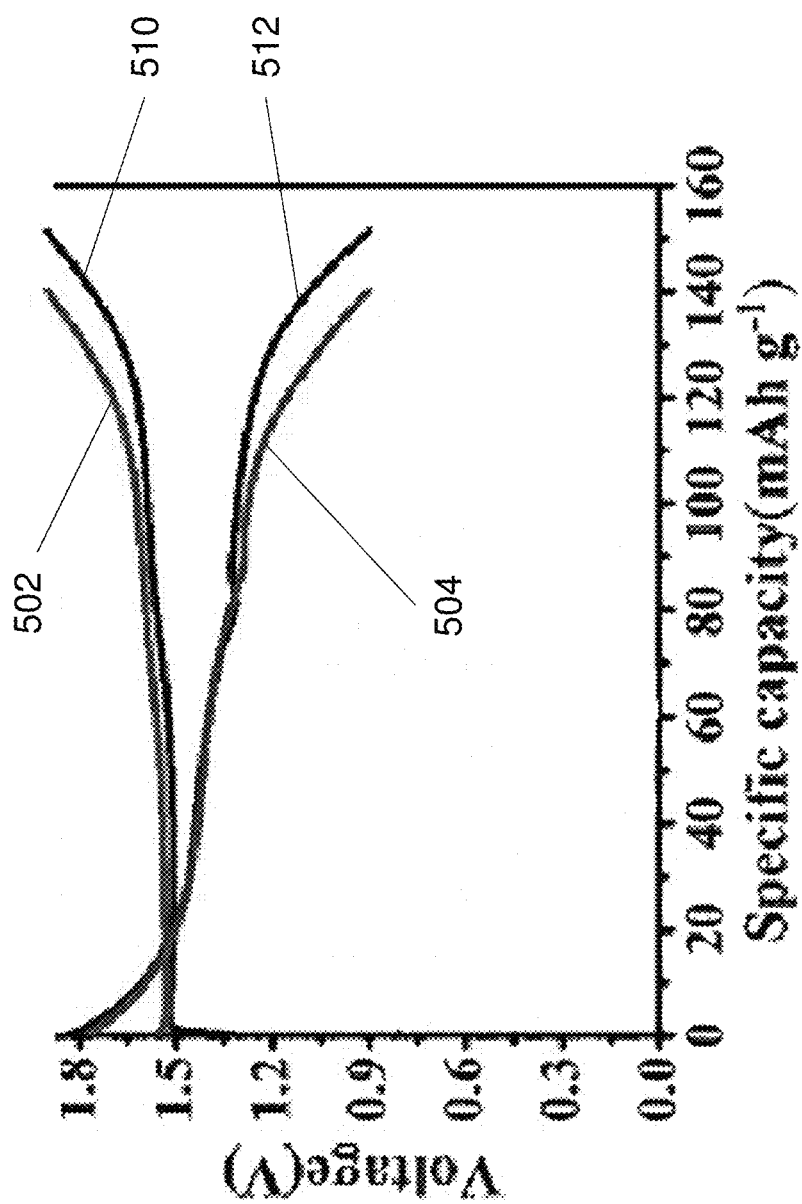
FIG. 5a shows an exemplary a charge and discharge curve with stable potential plateaus of the adaptable battery, at a current density of $0.1 Ag^{-1}$ at room temperature.
Figure 5B:
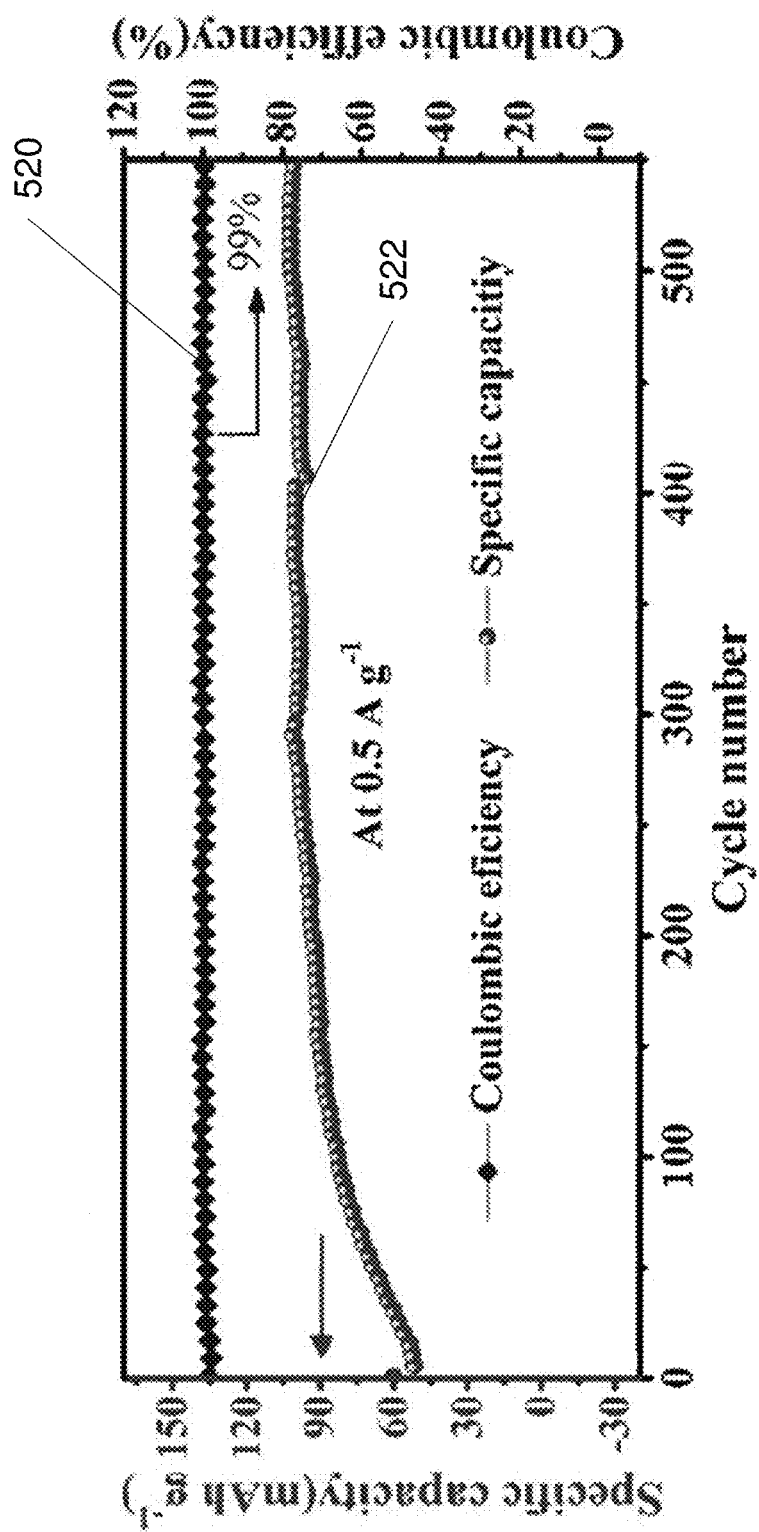
FIG. 5b illustrates cycling stability test of the battery comprising the electrolyte when performed at a current density of $0.5 Ag^{-1}$.

FIG. 5a shows an exemplary a charge and discharge curve (the fifth cycle) with stable potential plateaus of the adaptable battery, at a current density of $0.1 Ag^{-1}$ at room temperature. Curve 502 is a charging curve of a battery comprising the sol-gel electrolyte 106, 206. Curve 504 is a discharge curve of a battery comprising the sol gel electrolyte 106, 206. Curves 510, 512 are reference charge and discharge curves of a battery comprising a known liquid electrolyte. As can be seen in FIG. 5a the charge and discharge curves are substantially stable. FIG. 5b illustrates cycling stability test of the battery comprising the electrolyte 106, 206, when performed at a current density of $0.5 Ag^{-1}$. As shown in FIG. 5b, the curve 520 represents columbic efficiency of the electrolyte (and hence battery) at $0.5 Ag^{-1}$ for a plurality of cycles. As seen the efficiency is quite high (approximately 99%). Curve 522 represents the specific capacity across multiple cycles. The reversible capacity was $62 mAhg^{-1}$ for the initial cycle continuously increasing to $104 mAhg^{-1}$ and then maintained steadily with a high columbic efficiency 99%. This can be attributed to the improved interfacial compatibility between the PNA sol-gel electrolyte and the electrodes with the increase of cycling numbers, demonstrating the excellent stability of the thermoresponsive battery.

Figure 6B:
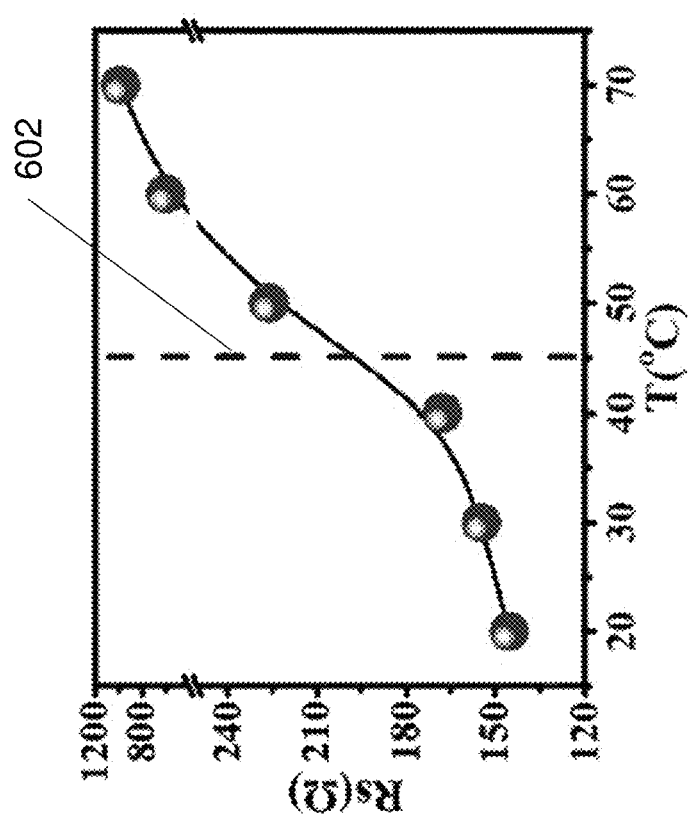
FIGS. 6a and 6b shows plots of impedance against temperature for a liquid electrolyte and the thermoresponsive electrolyte.
Figure 6A:
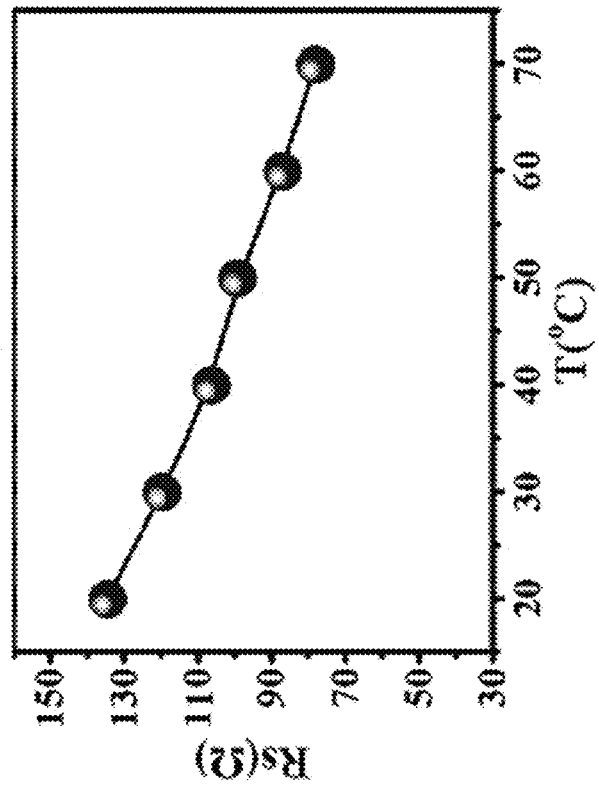

FIGS. 6a and 6b shows plots of impedance against temperature for a liquid electrolyte (FIG. 6a) and the thermoresponsive electrolyte 106, 206 (FIG. 6b). As can be seen in FIG. 6a the resistance of a battery having a standard liquid electrolyte is high at low temperatures and decreases as temperature increases. Referring to FIG. 6b the resistance of the thermoresponsive electrolyte 106, 206 is low while below a temperature threshold (line 600). The resistance changes and experiences almost a step change increase in resistance if the temperature exceeds above a threshold (shown as feature 602). In this example the threshold is approximately 45 degrees Celsius. The resistance is low while the electrolyte 106, 206 is in the first phase (i.e. solution phase). The resistance is high while the electrolyte 106, 206 is in the second phase (i.e. gel phase). The increased resistance reduces electrical conductivity and hence the battery stops working when the temperature exceeds the temperature threshold. As seen in FIG. 6b the inflection point on the curve represents the temperature threshold.

Figure 7:
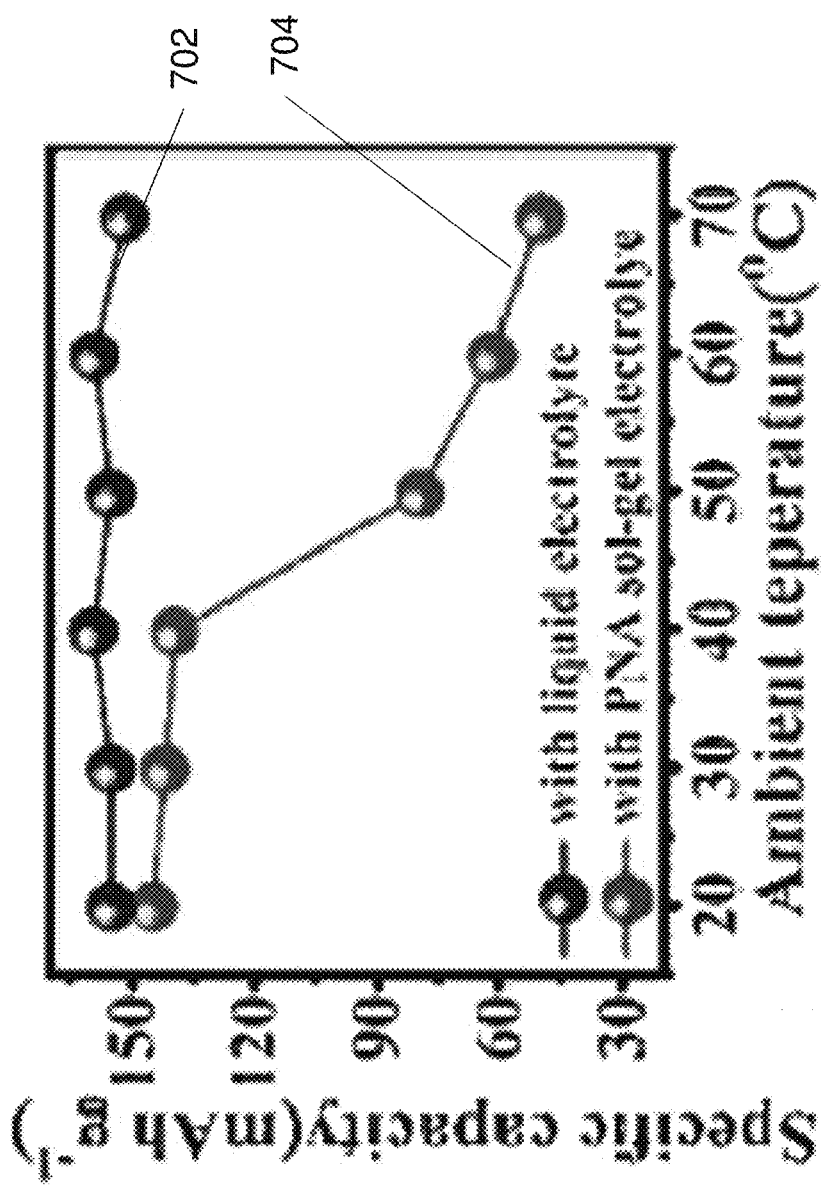
FIG. 7 illustrates specific capacity curves of a zinc ion battery including a liquid electrolyte and a battery comprising the thermoresponsive electrolyte.

FIG. 7 illustrates specific capacity curves of a zinc ion battery including a liquid electrolyte and a battery comprising the thermoresponsive electrolyte in accordance with the present invention. In a normal zinc ion battery the specific capacity remains substantially constant as shown by curve 702. A zinc-manganese dioxide battery including the thermoresponsive electrolyte has substantially constant specific capacity until a temperature threshold is exceeded. Once the temperature threshold is exceeded the specific capacity drops significantly due to the phase change of the electrolyte and due to the increase in resistance (i.e. reduction in conductivity). The reduction in specific capacity can be attributed to the inhibition of free movement of ions (i.e. charge) between the anode and the cathode. This is shown by curve 704. The inflection point at approximately 706 represents the temperature threshold. The temperature threshold in this example is approximately 45 degrees Celsius.

Figure 8:
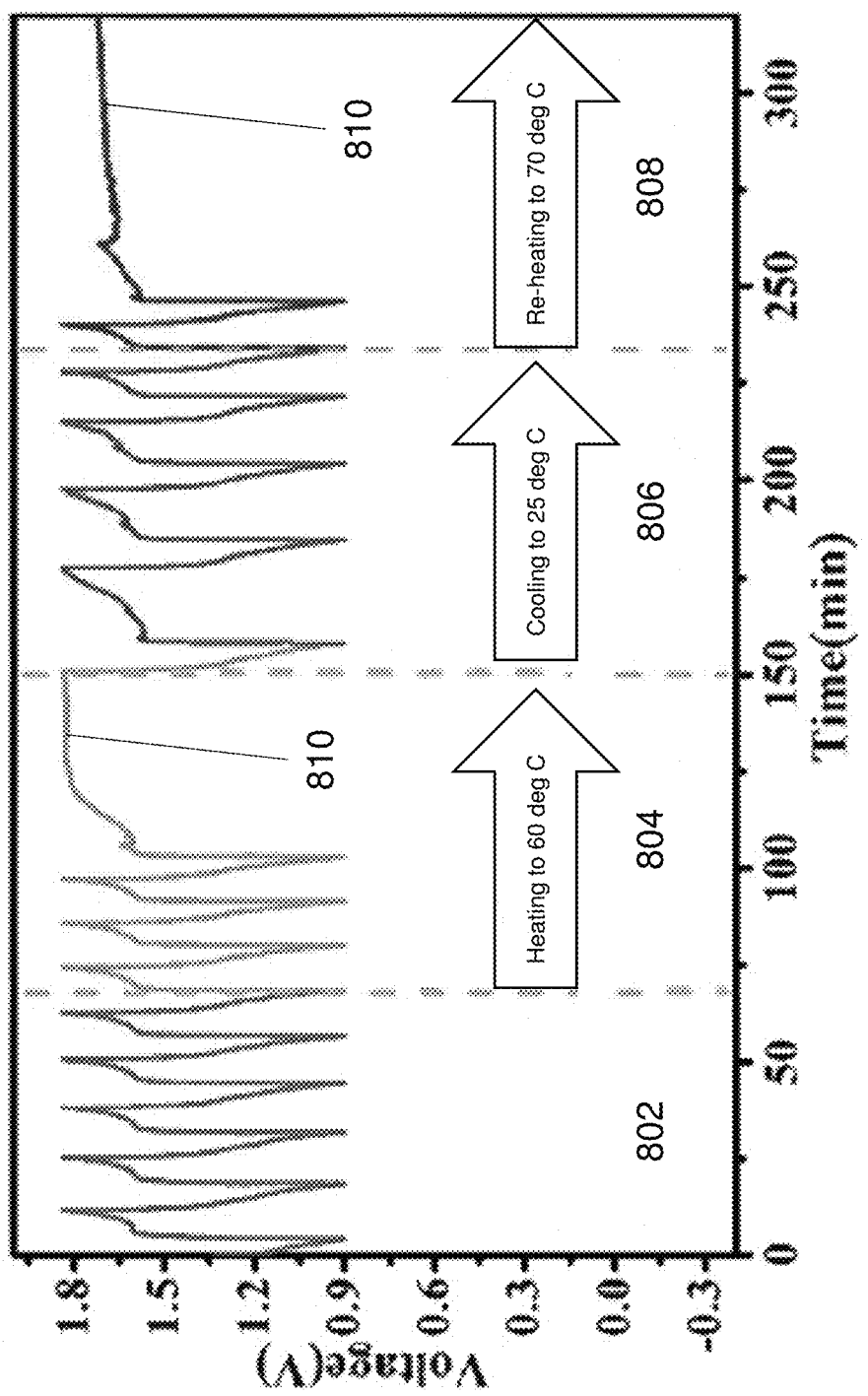
FIG. 8 illustrates operation of the adaptable battery incorporating the thermoresponsive electrolyte, in particular showing the voltage curve during charging and discharging of the battery including thermoresponsive electrolyte.

FIG. 8 illustrates operation of the adaptable electrical component incorporating the thermoresponsive electrolyte. In particular FIG. 8 shows charge and discharge cycles of the battery. The initial stage shows standard operation a first stage 802. The first stage indicates a stable temperature. The second stage 804 represents an increase in temperature of the battery. The performance of the battery stops when the temperature threshold is exceeded. In the example of FIG. 8, the temperature threshold is 60 degrees Celsius. The flat line section 810 represents the operation of the battery has stopped. The battery is cooled in the third section 806. As the temperature drops below threshold the charge and discharge functionality resumes. The fourth section 808 represents heating the battery again. Once again as seen in section 808 the battery stops working when the temperature exceeds a threshold. This is advantageous because the battery is a self-regulating, adaptable battery that regulates performance based on the temperature. This can increase the life span of the battery and maintain performance without causing degradation and avoiding false performance due to high temperatures. This is possible due to the thermoresponsive electrolyte being used in the battery.

The adaptable electrical component as described herein is a battery. In alternative embodiments the component may be any other electrical component that uses an electrolyte within it. For example the electrical component may be a capacitor that incorporated the thermoresponsive electrolyte as described herein, providing the capacitor with thermoresponsive capabilities.

The adaptable electrical component as described herein is advantageous because it provides a thermal self-protection electrical component e.g. a battery that can stop working when the temperature exceeds a threshold. The battery comprises an adaptable electrolyte that is thermoresponsive and changes phase from a solution phase to a gel phase when the temperature exceeds a threshold. The electrolyte changes phase back when the temperature decreases below the threshold. The increased resistance (i.e. reduced electrical conductivity) in the second phase provides self-protection for the battery in operation. The battery (i.e. adaptable electrical component) using the thermoresponsive electrolyte provides thermal runaway protection for the battery incorporating the thermoresponsive electrolyte.

The battery including the electrolyte as described herein is advantageous because it enables a recoverable self-protection ability that can stop operation when the temperature exceeds a threshold and spontaneously resume operation when the temperature reduces below the threshold. The use of an adaptable battery as described herein reduces safety risks due to high temperature and thermal runaway. The battery as described herein utilising the electrolyte as described provides a battery with a self-protection i.e. self-regulation mechanism. The battery address thermal runaway and spontaneously restore to an original performance after cooling.

The adaptable electrical component is a battery (or a cell). The battery, as described herein is particularly advantageous because it provides dynamic electrochemical performance and an adaptive response to temperature. It should be understood that a battery comprises a plurality of cells that may be coupled in a parallel or series configuration.

The adaptable electrical component (i.e. adaptable battery) is also advantageous because it provides a safe and rechargeable battery in response to temperature fluctuations. Batteries can often experience high temperature during operation e.g. during charging and discharging cycles. The described adaptable electrical component using the electrolyte described herein provides thermal safety and reduces or prevents high temperature related performance degradation. Further the described adaptable electrical component helps to reduce any an injuries to any users due to temperature related degradation of the battery. When the temperature exceeds a threshold the battery ceases operation and ceases charge transfer between the anode and cathode, thereby making the battery safe to handle by a user.

The present invention is advantageous because it is a battery or other electrical component that demonstrates smart behaviour in response to temperature fluctuations. The component functions in this manner due to the electrolyte used inside the component. The component demonstrates smart behaviour because the component automatically adapts to temperature changes and automatically regulates i.e. adapts its function based on temperature changes. This provides the component with an inbuilt safety feature for high temperatures.

The description of any of these alternative embodiments is considered exemplary. Any of the alternative embodiments and features in the alternative embodiments can be used in combination with each other or with the embodiments described with respect to the figures.

The foregoing describes only a preferred embodiment of the present invention and modifications, obvious to those skilled in the art, can be made thereto without departing from the scope of the present invention. While the invention has been described with reference to a number of preferred embodiments it should be appreciated that the invention can be embodied in many other forms.

The invention claimed is:

1. An adaptable electrical component comprising:
   a first electrode and a second electrode;
   the first electrode being spaced apart from the second electrode;
   a polymer electrolyte disposed between the first electrode and the second electrode;
   a housing retaining the first electrode, second electrode and the polymer electrolyte;
   wherein the polymer electrolyte comprises a mixture of an aqueous electrolytic solution and a plurality of copolymer chains covalently linked by a crosslinking agent being soluble in the aqueous electrolytic solution at a temperature below a threshold and the polymer electrolyte is a thermoresponsive polymer electrolyte, such that one or more characteristics of the polymer electrolyte changes in response to a temperature exceeding the threshold.

2. An adaptable electrical component in accordance with claim 1, wherein the temperature is either temperature of the polymer electrolyte or temperature within the housing.

3. An adaptable electrical component in accordance with claim 1, wherein the one or more characteristics are one or more of: electrical conductivity, phase, viscosity, density, electrical resistance or mass.

4. An adaptable electrical component in accordance with claim 3, wherein the phase and electrical conductivity of the polymer electrolyte changes when the temperature exceeds a threshold.

5. An adaptable electrical component in accordance with claim 1, wherein the polymer electrolyte is a first phase and having a first electrical conductivity when the temperature is below the threshold;
the polymer electrolyte changes phase to a second phase and having a second electrical conductivity when the temperature exceeds the threshold;
wherein the first electrical conductivity is greater than the second electrical conductivity; and;
wherein the polymer electrolyte changes back to a first phase and having a first conductivity when the temperature drops below the threshold.

6. An adaptable electrical component in accordance with claim 5, wherein the first phase is a solution phase and the second phase is a gel phase.

7. An adaptable electrical component in accordance with claim 1, wherein the first electrode is an anode and the second electrode is a cathode; wherein the polymer electrolyte permits transfer of charge from the anode to the cathode while the polymer electrolyte is in the first phase and the polymer electrolyte restricting transfer of charge from the anode to the cathode while the polymer electrolyte is in the second phase.

8. An adaptable electrical component in accordance with claim 1, wherein the polymer electrolyte comprises a first phase to second phase transition time of less than 200 seconds and the polymer electrolyte comprises a second phase to first phase transition time of less than 300 seconds.

9. An adaptable electrical component in accordance with claim 1, wherein the polymer electrolyte comprises a copolymer formed from an acrylamide and an acrylic acid.

10. An adaptable electrical component in accordance with claim 9, wherein the polymer electrolyte comprises a poly (N-isopropylacrylamide-co-acrylic acid) copolymer.

11. An adaptable electrical component in accordance with claim 1, wherein the polymer electrolyte comprises one or more dissolved salts.

12. An adaptable electrical component in accordance with claim 1, wherein the anode comprises zinc or a zinc compound; and the cathode comprises manganese or manganese compound.

13. An adaptable electrical component in accordance with claim 12, wherein the anode comprises a zinc foil and the cathode comprises one or more manganese dioxide rods or a manganese dioxide sheet.

14. An adaptable electrical component in accordance with claim 1, wherein the cathode further comprises polyvinylidene fluoride.

15. An adaptable electrical component in accordance with claim 1, wherein the electrical component comprises a separator disposed between the anode and the cathode such that a short circuit is avoided between the anode and the cathode.

16. An adaptable electrical component in accordance with claim 15, wherein the separator comprises a polyacrylonitrile (PAN) membrane.

17. An adaptable electrical component in accordance with claim 1, wherein the electrical component comprises a current collector and wherein a portion of the cathode is attached to the current collector.

18. An adaptable electrical component in accordance with claim 17, wherein the current collector is a plate, the cathode is a paste including a plurality of manganese dioxide rods, and wherein the paste is disposed on one side of the plate.

19. An adaptable electrical component in accordance with claim 17, wherein the current collector comprises a cloth comprising one or more carbon nanotubes.

20. An adaptable electrical component in accordance with claim 1, wherein the adaptable electrical component is battery.

21. An adaptable electrical component, the adaptable electrical component is an adaptable battery, wherein the adaptable electrical component comprises:
an anode, a cathode, the anode being spaced away from the cathode;
a polymer electrolyte disposed between the anode and the cathode;
a separator element being disposed between the anode and the cathode;
a current collector, the current collector being a planar element having at least two sides, the cathode being disposed on a side of the current collector that faces the anode;
the anode comprising a zinc;
the cathode comprising manganese dioxide;
the polymer electrolyte comprises a mixture of an aqueous electrolytic solution and a plurality of copolymer chains covalently linked by a crosslinking agent being soluble in the aqueous electrolytic solution at a temperature below a threshold and the polymer electrolyte being a thermoresponsive polymer electrolyte, the polymer electrolyte is changeable between a first phase and a second phase, the polymer electrolyte changes from a first phase to the second phase when the temperature of the polymer electrolyte exceeds the threshold; and the polymer electrolyte changes from a second phase to a first phase when the temperature of the polymer electrolyte reduces to below the threshold;
in a first phase the polymer electrolyte being electrically conductive such that in the first phase ions being able to freely migrate between the anode and the cathode, and;
in a second phase the polymer electrolyte being less conductive than when in the first phase such that in the second phase ions being inhibited from moving between the anode and the cathode thereby shutting down or reducing operation of the electrical component.

22. An adaptable electrical component in accordance with claim 21, wherein the cathode comprises a plurality of manganese dioxide rods positioned in situ among a plurality of carbon tubes; and the anode comprising zinc foil, and wherein the manganese dioxide further comprises alpha phase manganese.

23. An adaptable electrical component in accordance with claim 22, wherein the electrical component the current collector comprises a rough plane, the cathode being disposed on the rough plane, and the current collector comprises a carbon nanotube cloth.

24. An adaptable electrical component in accordance with claim 23, wherein the cathode comprises an alpha phase manganese dioxide paste.

25. An adaptable electrical component in accordance with claim 24, wherein the cathode further comprises polyvinylidene fluoride (PVDF).

26. An adaptable electrical component in accordance with claim 25, wherein the polymer electrolyte comprises poly (N-isopropylacrylamide-co-acrylic acid) copolymer with zinc sulphate salts or zinc sulfide salts dissolved therein.

27. An adaptable electrical component in accordance with claim 26, wherein the separator element comprises a polyacrylonitrile (PAN) membrane.

* * * * *